(12) United States Patent
Yablonski

(10) Patent No.: US 6,679,704 B2
(45) Date of Patent: Jan. 20, 2004

(54) EDUCATIONAL TOOL RELATED TO CREATURES, WILD AND DOMESTIC

(76) Inventor: Pete Yablonski, R.D. #1, Box 303, Saxton, PA (US) 16678

( * ) Notice: Subject to any disclaimer, the term of this patent is extended or adjusted under 35 U.S.C. 154(b) by 0 days.

(21) Appl. No.: 10/079,332
(22) Filed: Feb. 20, 2002
(65) Prior Publication Data
US 2003/0157471 A1 Aug. 21, 2003

(51) Int. Cl.[7] ............................................. G09B 25/00
(52) U.S. Cl. ...................... 434/365; 434/430; 283/62; 283/79
(58) Field of Search ............................ 283/62, 79, 46, 283/56, 900; 434/257, 247, 225, 430, 365; 40/300

(56) References Cited

U.S. PATENT DOCUMENTS

| | | | | | |
|---|---|---|---|---|---|
| 1,010,782 | A | * | 12/1911 | Monteith | 283/46 |
| 1,276,454 | A | * | 8/1918 | Van Deventer | 283/56 |
| 4,016,939 | A | * | 4/1977 | Thron | 273/244 |
| 4,905,388 | A | * | 3/1990 | Sinkow | 40/110 |
| 5,351,993 | A | * | 10/1994 | Wright et al. | 283/62 |
| 5,984,685 | A | * | 11/1999 | Portnoy | 434/262 |
| 6,006,460 | A | * | 12/1999 | Blackmer | 40/300 |

* cited by examiner

Primary Examiner—Kien T. Nguyen
(74) Attorney, Agent, or Firm—Daphe Pinto Fickes

(57) ABSTRACT

An educational tool having a substrate with a first side and a second side having thereon at least two pictures of creatures on the first side of the substrate spaced at a defined distance from each other, and a description of the creatures on the second side in approximate registration to the picture on the first side; and a facsimile of a license on said first side of the substrate.

20 Claims, 2 Drawing Sheets

Rabbit: A furry mammal with long ears and a short fluffy white tail. Rabbits hop on their back legs using their front legs to balance like a child playing leapfrog. When being hunted by an enemy they can run up to 18 miles per hour and can vertical jump as high as 10 feet. Adult rabbits range in size from 8 to 14 inches in length and can weigh from 2 to 5 pounds. The male is called a buck and the female a doe. A doe may have 4 to 8 litters a year with 4 to 5 blind, hairless kittens in each litter. They will reach sexual maturity in about six months, and have a life span of about ten years. A rabbit's home is called a form. This is a shallow hole that is hidden among weeds, grasses or heavy undergrowth. Rabbits are mainly plant eaters.

Wild Turkey: This game bird of North America is a favorite among hunters. Adult male turkeys, or toms, are up to four feet in length. They are noted for strutting, fanning their colorful feathered tails and gobbling. The male turkey has a long bunch of bristled feathers on their chest called a beard and a pouch like growth of skin at the throat called a waddle. Females, or hens, are much smaller in size and their feathers are considerably duller. Some hens may grow beards. Although turkeys sleep in trees at night, hens lay their eggs in nests on the ground. The eggs are a pale cream color with brown speckles. The young are called poults. Turkeys, very sociable birds, gather in flocks and talk to each other by making a variety of sounds. A turkey's diet consists of nuts, seeds, insects, fruit and berries

Raccoon: This mammal has long coarse hair, a bushy ringed tail, and black hair around its eyes that make it look like a bandit. Raccoons are from 30 to 38 inches long and weigh anywhere from 12 to 25 pounds. Raccoons in the wild will live about 5 years. One of their more distinguishing characteristics is their strong sharp claws. They use these claws to climb, find food and to handle objects. Raccoons live in small family groups with their homes in trees or on the ground. Raccoons mate only once a year and produce 3 to 4 young in a litter. When the babies are born their eyes are sealed shut and they have none of the black distinguishing markings of an adult raccoon. The raccoon's diet includes a variety of foods including: crabs, fish, frogs, crayfish, small insects, mice, acorns, bird eggs, fruit, nuts and seeds.

Gray Squirrel: This lively and noisy rodent can well be considered one of wildlife's great entertainers. Gray squirrels leap from tree to tree with great ease. They are fun to watch as they scamper about gathering berries, fruits, nuts and seeds to store up for the winter. These furry gray animals have large dark eyes, small round ears and long bushy tails that curl up over their backs. They seem to have a language all their own filled with chirps and noises that sometimes sound like grumbling. Squirrels can live in a hollow tree trunk or in a big nest on a branch. The mother can give birth twice a year to at least 2 hairless, blind babies. A full grown gray squirrel can weigh about 1.5 pounds and average between 15 and 24 inches in length including their tails. A gray squirrel can live up to 5 years in the wild.

Black Bears: These large mammals seem friendly and playful and can make you laugh as they beg for food, but they are very dangerous. Bears have long thick fur and huge heads. They do not see or hear very well, but they have an excellent sense of smell. Bears have 5 toes, each sporting an uncovered claw. These claws are used to dig up roots and bugs and to tear apart their prey. Bears seem to lumber through the woods on their huge feet and have a very loud roar. Black bears are loners and spend most of the winter sleeping in a den. This is called hibernation. The female or sow gives birth to 1 to 4 blind, hairless cubs during this time. Black bears can weigh from 200 to 500 pounds and are about 60 inches tall. They can live up to 30 years. Black bears are not all black. There is a cinnamon or brown bear, a white bear and one that is even considered blue.

Ruffed Grouse: Early every morning the ruffed grouse goes to a favorite log and he then begins "drumming". The grouse does this by beating the air with his wings creating a sonic boom type sound. After he gets warmed up, the noise actually sounds like a drum roll. These birds are covered with a thick dull coat of feathers. The male has a roll of shiny black feathers around his neck that he lifts upward to form a ruff. During the mating season males fight fiercely as part of the courting ritual. The hens lay 9 to 15 spotted eggs in a nest at the base of a tree. The grouse all live together in a flock called a covey. Grouse live on berries, insects, seeds, leaves and buds. In winter, the leg feathers of the grouse grow longer for warmth. A web also grows between their toes which helps them walk on the snow. The Ruffed Grouse is the state bird of Pennsylvania.

*A note from Pappy*

I hope you have hours of fun with these and that you learn facts about these animals. So when you spot these animals out in the wild or at the zoo you will be able to identify them and know a little bit about them.

*Pappy*

Pappy Pete

Ring-Necked Pheasant: These game birds are well known for their beautiful colored feathers, their long feathers and their tasty meat. The body feathers of the males are brown, black and white. The neck and head of these are covered with shiny blue-green feathers. The males, or cocks, have a white band around their necks. They also have red skin surrounding their eyes. The hens are a dusty brown color and do not have a neck ring. The cocks do a ritual mating dance by showing off their feathers, crowing, crackling and whistling. The hens lay 2 to 15 eggs in a nest that she builds by herself. The eggs are tan, olive green, white and can be plain in color or speckled. Pheasants live mostly in woodlands. They eat roots, fruits, seeds, flowers and insects. These birds can fly at speeds up to 40 miles per hour, but only for short distances.

White-Tailed Deer: These large game animals have a tall that is about 12 inches long. It is brown on the top and white underneath. It's tail stands straight up when frightened, showing off it's white underside. Deer are the fastest animals with antlers on their heads. These antlers grow permanent knoblike bones on the deer's skull. When growing, they are covered with velvet, which is soft, velvety hair. Deer can run up to 40 miles per hour and jump as high as 20 feet. Male deer are called bucks and females are called does. Does usually give birth to 1 or 2 fawns at a time. Fawns are around 4 to 5 pounds at birth and have white spots on their backs. Deer usually do not have a permanent home. Instead, they move in an area called a home range. When they forage for food, look for mates and hide from their enemies.

FIG. 1B

EDUCATIONAL TOOL RELATED TO CREATURES, WILD AND DOMESTIC

BACKGROUND OF THE INVENTION

This invention relates to an educational tool, and in particular it relates to an educational tool about creatures in the wild and domesticated creatures.

Pictures of creatures that are wild and ones that are domesticated are known and a description of said creatures associated with the pictures may be known. However, there is a lack of knowledge with regard to the appropriate license that is required for a particular creature.

A need exists for an educational tool that educates people with regard to the appropriate license associated with a particular creature.

SUMMARY OF THE INVENTION

In a first aspect, the invention provides an educational tool comprising a substrate having a first side and a second side having thereon
- (a) at least two pictures of creatures on the first side of the substrate spaced at a defined distance from each other, and a description of the creatures on the second side in approximate registration to the picture on the first side; and
- (b) a facsimile of a license on said first side of the substrate.

In the first aspect, the creatures may be selected from the group consisting of wild and domesticated.

In the first aspect, the invention further comprises perforations provided around each picture on the first side of the substrate and its corresponding description on the second side.

In the first aspect, the invention further comprises a note from the designer of the educational tool on the second side of the substrate in approximate registration to the facsimile of a license located on the first side.

BRIEF DESCRIPTION OF THE DRAWINGS

FIG. 1b is an illustration of the second side of a substrate showing the description of the creatures displayed on the first side of the substrate, and the optional note from the designer of the education tool.

DETAILED DESCRIPTION OF THE INVENTION

Figure 1A:
FIG. 1a is an illustration of the first side of a substrate showing the pictures of the creatures and the facsimile of a license.

The educational tool of this invention comprises at least two pictures, typically two to fifty pictures, more typically six to twenty five pictures, still more typically seven to fifteen, and most typically eight pictures on the first side of a substrate. The pictures may be at a defined distance from each other, which may range from about 0 to about 3 cm, typically about 0 to about 2 cm, more typically about 0.25 cm to about 1 cm. In one embodiment, the pictures may be touching each other without the substrate being seen between the pictures or there may be a defined space between the pictures up to about 3 cm. The pictures of the creatures may be selected from the group consisting of wild creatures and ones that have been domesticated. Creatures in the wild may be selected from the group consisting of animals such as deer, bears, rabbits, moose, racoons, squirrels, etc.; water creatures such as fish, for example, trout, salmon, etc.; birds such as fowl; etc. Some examples of domestic creatures include, but are not limited to, dogs, cats, rhodents such as gerbils, etc. The description corresponding to each of said pictures of the creatures, wild or domestic is provided on the second side of the substrate in approximate registration with the picture, and includes facts relating to said picture. For example, if the picture is that of a rabbit, interesting facts regarding its length, weight, speed, height a rabbit can jump, etc. may be provided in the description.

The substrate may be any flexible or rigid sheet material capable of being printed or having material, such as an ink or colorant containing composition, applied to it. Some examples of substrates include paper, cardboard, plastic substrates such as polyethylene terephthalate that have preferably been opacified with a pigment, plastic coated papers, etc. Typically, the substrate is a heavy gauge paper. The ink or colorant containing composition applied to the substrate may be any one of the colors in the color spectrum. Typically, yellow, magenta, cyan and black inks or colorant containing materials are applied in the desired order to give all the colors in the spectrum. Specialty colors such as gold and silver or luminescent materials may also be applied to add additional beauty to the pictures of the creatures, wild or domestic, shown on the first side. The substrate itself may be colored, or more typically white, to provide the background to the pictures, facsimile of a license, text, and the optional note from the designer present thereon.

A facsimile of a license is also provided on the first side of the substrate. For creatures in the wild, the facsimile of a license is selected from the group consisting of a facsimile of a hunting license, a facsimile of a fishing license, a facsimile of a archery license, a facsimile of a muzzleloader license, a facsimile of a trappers license, and a facsimile of a cross-bow license. Some examples of facsimiles of licenses for domestic creatures include a facsimile dog license, a facsimile of a cat license, etc. Typically, the pictures provided on the first side are a collection of the same kind of creature. For example, all the pictures are of animals in the wild and the corresponding facsimile of a license is a facsimile of a hunting license, or all the pictures are of fish and the corresponding facsimile of a license is a facsimile of a fishing license such a trout license, salmon license, etc. For example, all the pictures are of birds, such as water fowl, the facsimile of a license would be a facsimile of a duck stamp. Also, for example, if all the pictures are of different breeds of dogs, the facsimile of a license would be of a dog license. Alternately, if the same facsimile of a license is applicable to some animals and some birds for example, the pictures on the first side can include a combination of pictures of animals and birds.

In one embodiment, perforations may be provided at the juncture of adjacent pictures where they are at a defined distance of about 0 cm from each other or at an approximate point about equidistant from each picture where they are spaced apart. These perforations would allow for easy separation of the pictures and their corresponding description and the facsimile of the license for easy storage of the educational tool.

In a separate embodiment, the second side of the substrate may also carry a note from the designer that is positioned in approximate registration to the facsimile of a license located on the first side. In addition, the note from the designer may be accompanied by a photograph of the designer.

What is claimed is:

1. An educational tool comprising a substrate having a first side and a second side having thereon
   (a) at least two pictures of creatures on the first side of the substrate spaced at a defined distance from each other, and a description of the creatures on the second side in approximate registration to the picture on the first side; and
   (b) a facsimile of a license on said first side of the substrate.

2. The educational tool of claim 1 wherein the creatures may be selected from the group consisting of wild and domestic.

3. The educational tool of claim 2 wherein the domestic creatures are selected from the group consisting of dogs, cats, and rodents.

4. The educational tool of claim 2 wherein the facsimile of a license for creatures in the wild is selected from the group consisting of a facsimile of a hunting license, a facsimile of a fishing license, a facsimile of a archery license, a facsimile of a muzzleloader license, a facsimile of a trappers license, and a facsimile of a cross-bow license.

5. The educational tool of claim 2 wherein the facsimile of a license for domestic creatures is selected from the group consisting of a facsimile of a dog license and a facsimile of a cat license.

6. The educational tool of claim 1 wherein the creatures in the wild may be selected from the group consisting of animals, water creatures, and birds.

7. The educational tool of claim 6 wherein the animals are selected from the group consisting of rabbits, deer, bears, moose, racoons, and squirrels.

8. The educational tool of claim 6 wherein the water creatures are fish.

9. The educational tool of claim 8 wherein the fish are selected from the group consisting of trout and salmon.

10. The educational tool of claim 8 wherein the facsimile of a fishing license is selected from the group consisting of a facsimile of a trout license, and a facsimile of a salmon license.

11. The educational tool of claim 6 wherein the bird is a water fowl, and the facsimile of a license is a facsimile of a duck stamp.

12. The educational tool of claim 1 comprising two to fifty pictures.

13. The educational tool of claim 12 comprising six to twenty five pictures.

14. The educational tool of claim 13 comprising seven to fifteen pictures.

15. The educational tool of claim 14 comprising eight pictures.

16. The educational tool of claim 1 wherein the defined distance is about 0 to about 3 cm.

17. The educational tool of claim 16 wherein the defined distance is 0 to about 2 cm.

18. The educational tool of claim 16 wherein the defined distance is about 0.25 cm to about 1 cm.

19. The educational tool of claim 1 further comprising perforations provided around each picture on the first side of the substrate and its corresponding description on the second side.

20. The educational tool of claim 1 further comprising a note from the designer of the educational tool on the second side of the substrate in approximate registration to the facsimile of a license located on the first side.

* * * * *